(No Model.)  6 Sheets—Sheet 1.
W. M. CUTHBERT.
SYSTEM OF ELECTRIC BLOCK SIGNALS FOR RAILWAYS.
No. 527,267. Patented Oct. 9, 1894.
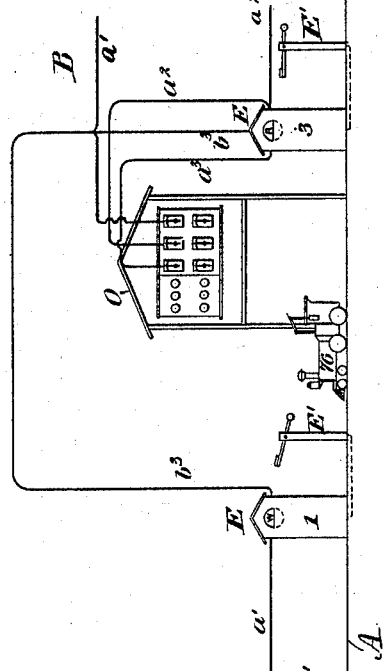
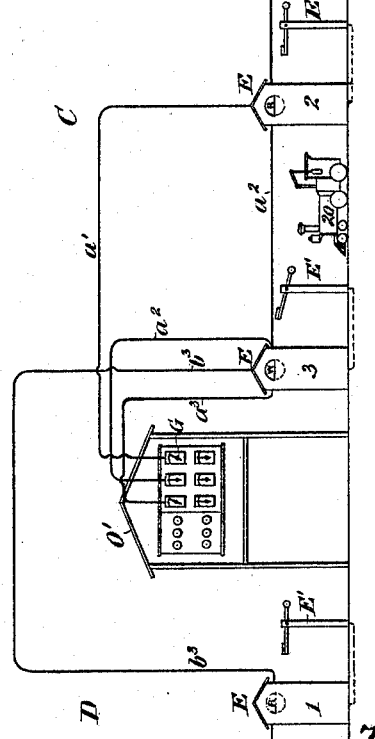
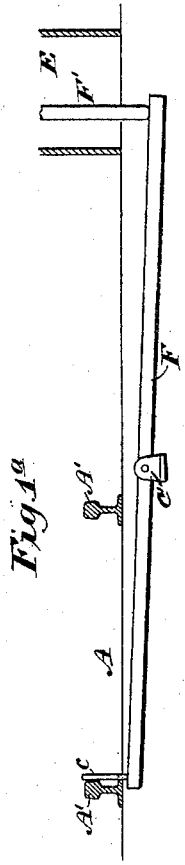
Witnesses
Edward Thorpe
Herbert Griggs
Inventor
William M. Cuthbert

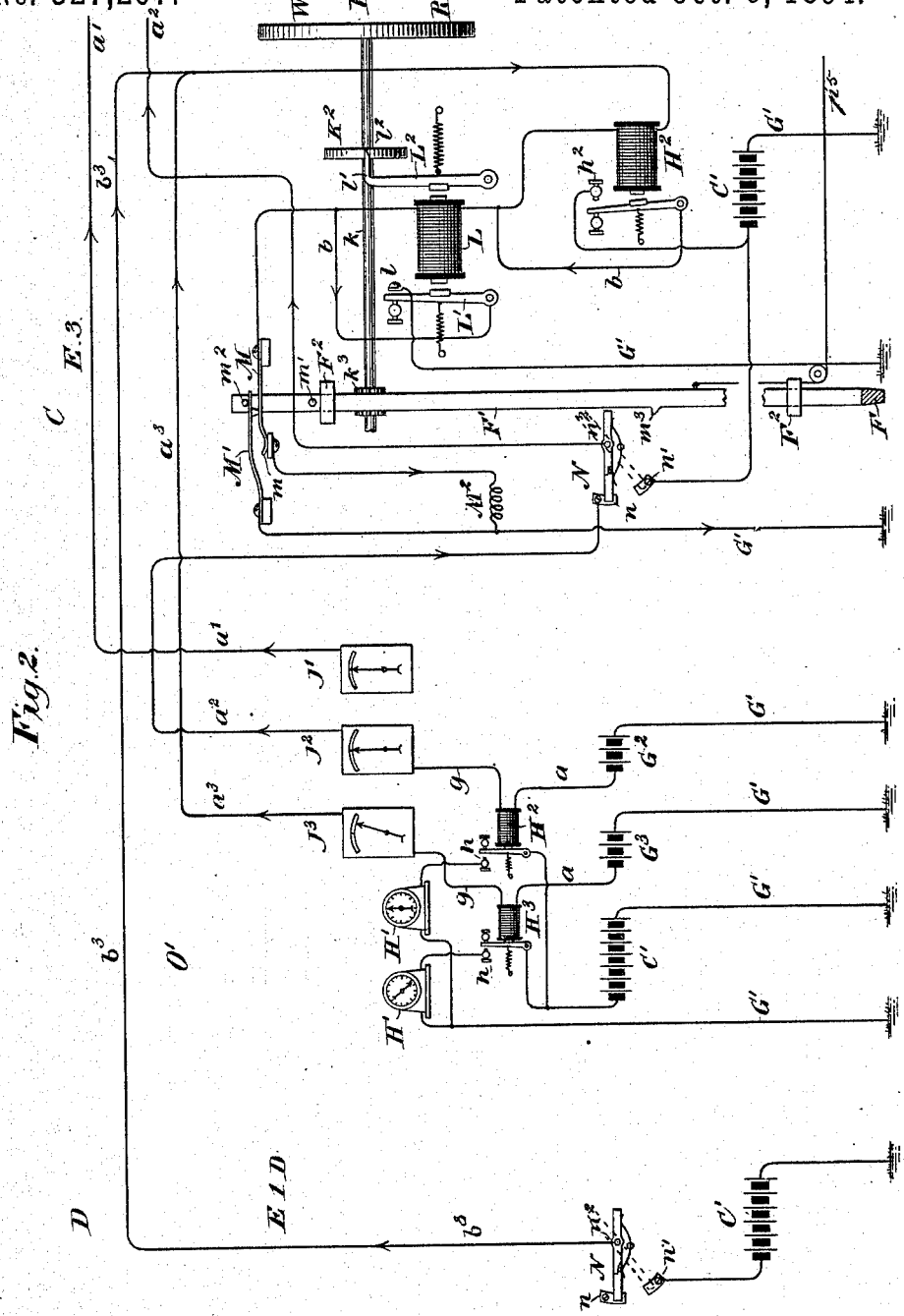

(No Model.)
W. M. CUTHBERT.
SYSTEM OF ELECTRIC BLOCK SIGNALS FOR RAILWAYS.
No. 527,267.  Patented Oct. 9, 1894.
6 Sheets—Sheet 3.
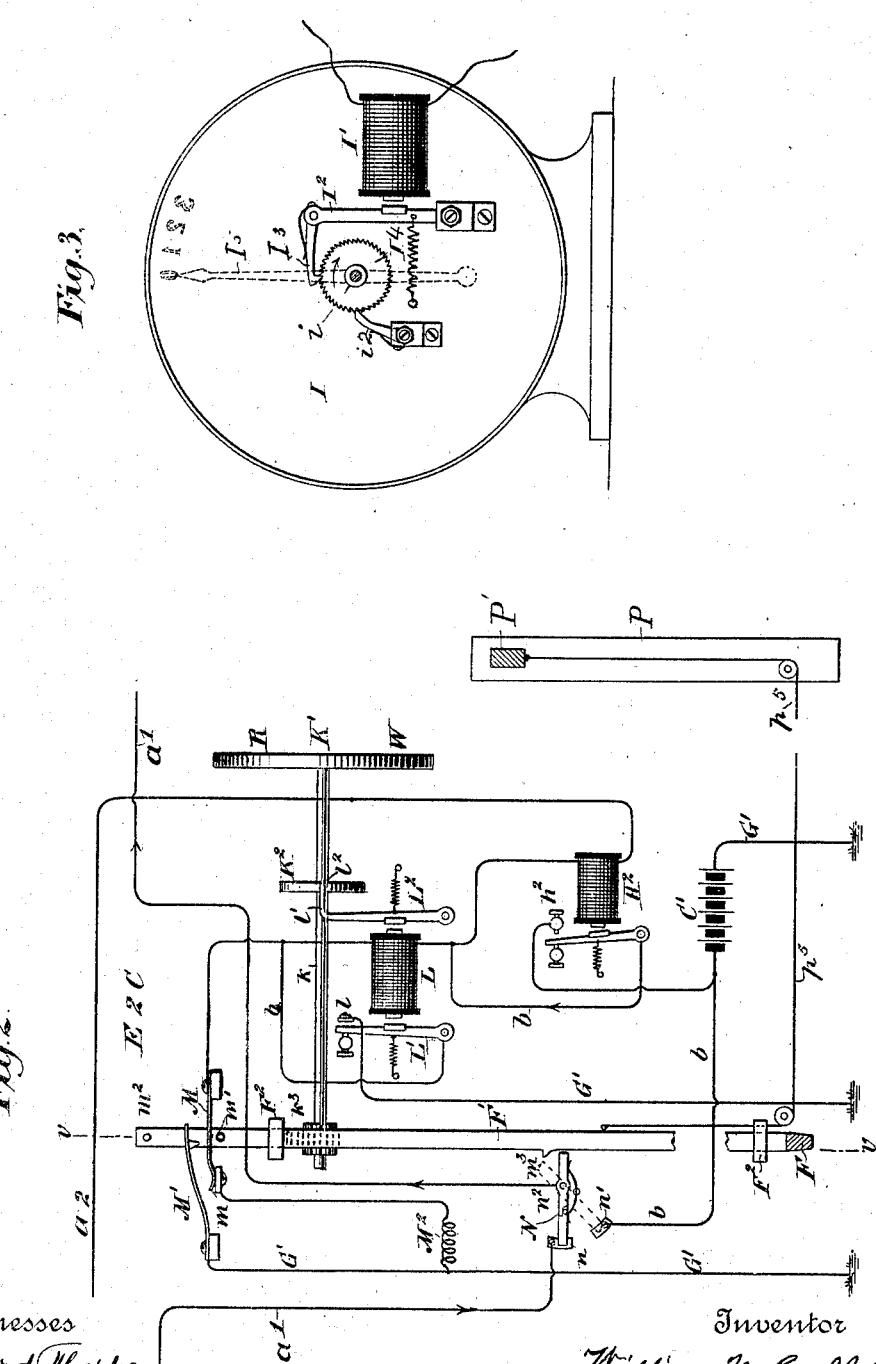
Witnesses
Edward Thorpe
Herbert Grigg
Inventor
William M. Cuthbert (No Model.)  6 Sheets—Sheet 4.
W. M. CUTHBERT.
SYSTEM OF ELECTRIC BLOCK SIGNALS FOR RAILWAYS.
No. 527,267.  Patented Oct. 9, 1894.
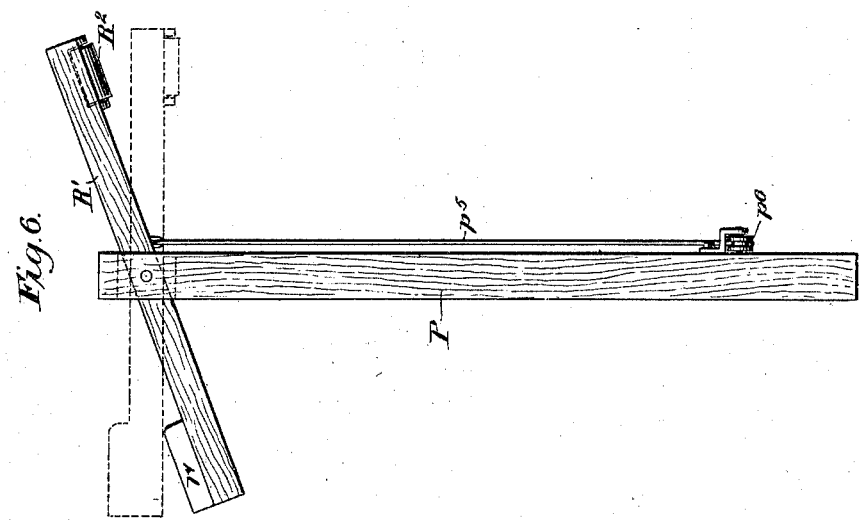
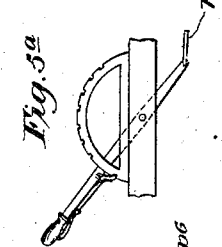
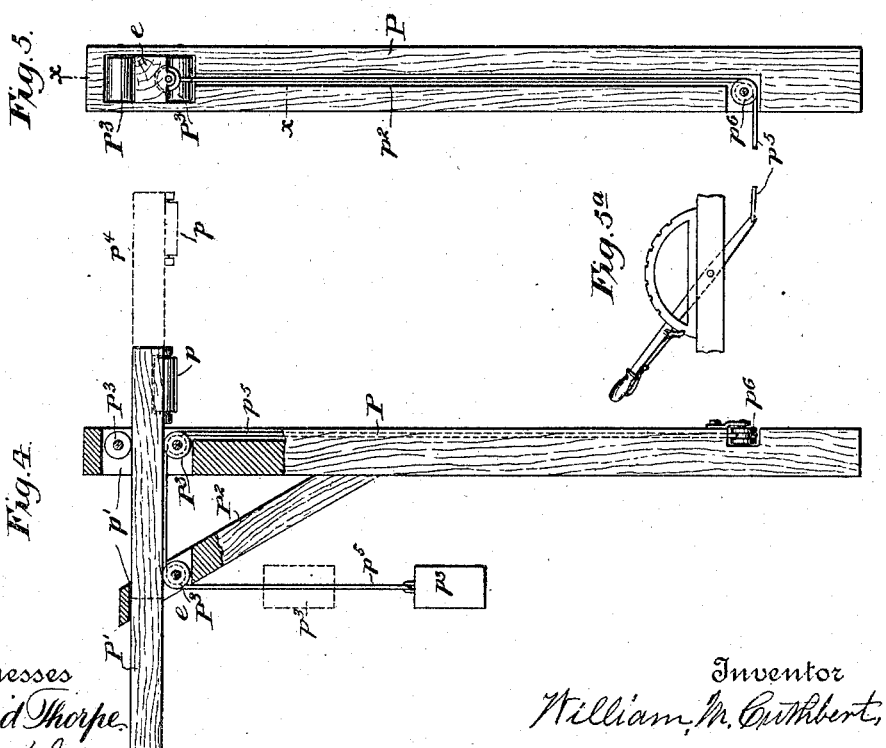
Witnesses
Edward Thorpe
Herbert Griggs
Inventor
William M. Cuthbert, (No Model.) 6 Sheets—Sheet 5.
W. M. CUTHBERT.
SYSTEM OF ELECTRIC BLOCK SIGNALS FOR RAILWAYS.
No. 527,267. Patented Oct. 9, 1894.
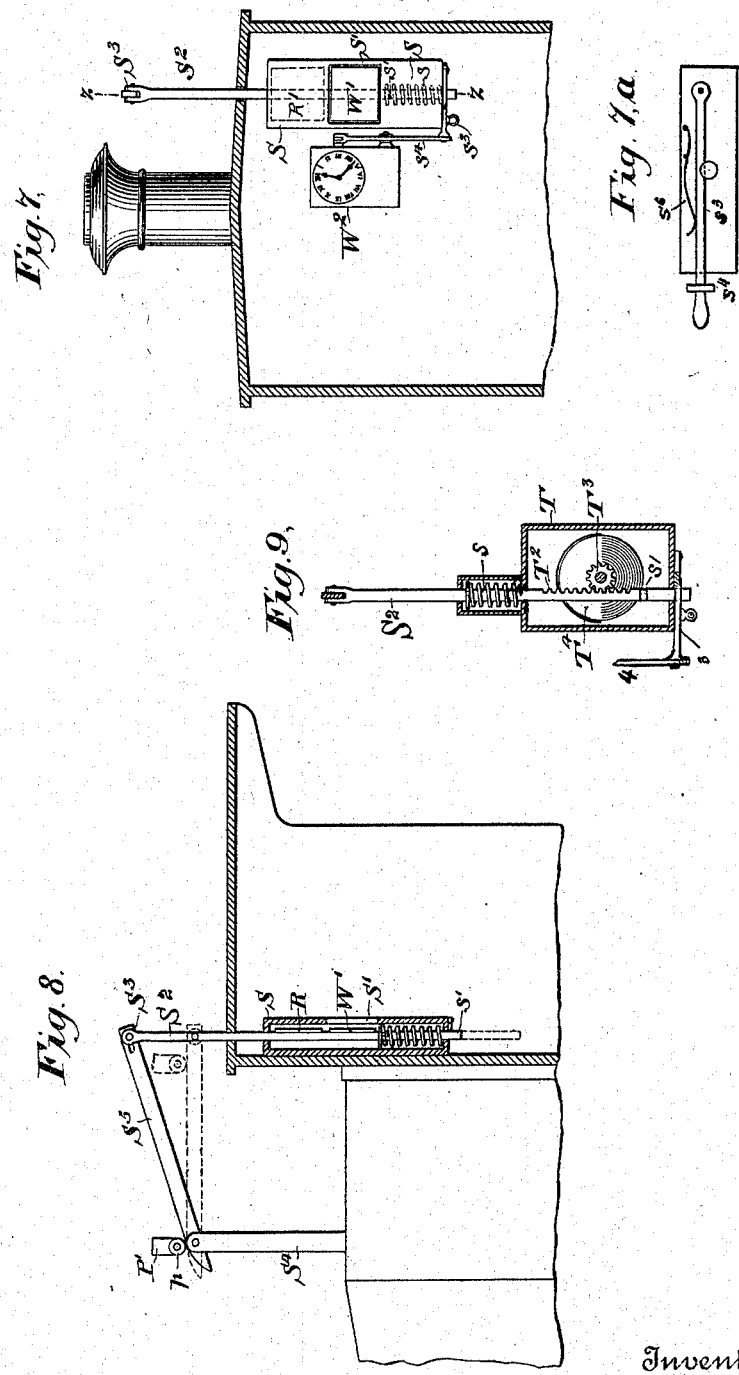
Witnesses
Edward Thorpe
Herbert Griggs
Inventor
William M. Cuthbert

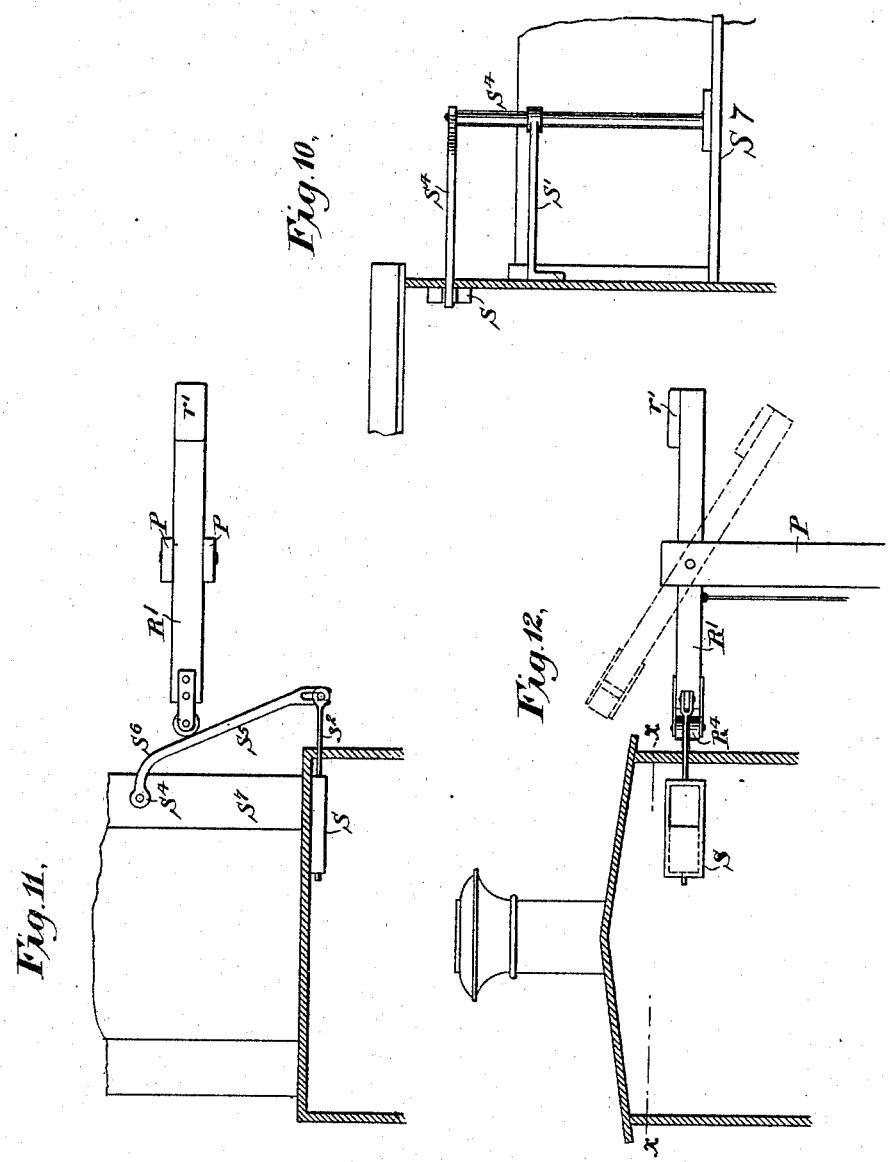

UNITED STATES PATENT OFFICE.

WILLIAM M. CUTHBERT, OF BROOKLYN, NEW YORK.

SYSTEM OF ELECTRIC BLOCK-SIGNALS FOR RAILWAYS.

SPECIFICATION forming part of Letters Patent No. 527,267, dated October 9, 1894.

Application filed February 16, 1893. Serial No. 462,657. (No model.)

*To all whom it may concern:*

Be it known that I, WILLIAM M. CUTHBERT, a citizen of the United States, residing at Brooklyn, in the county of Kings and State of New York, have invented a new and useful Method or System of Electric Block-Signals for Railways, of which the following is a specification.

My invention relates to block signals, electrical, automatic and locomotive cab signals.

The objects of my improvements are: first, to prevent collisions between railroad trains; second, a signal that may be seen by the engineer of a train, irrespective of the weather; third, accuracy and economy in operating. I attain these objects by dividing a railroad into a number of longitudinal sections, each section being provided with, and represented by an office, and also by the subdividing said sections into blocks, each block being provided with, and represented by a signal post, said posts being electrically connected the one with the other by an open circuit of high electric motive force, and with the office by a closed circuit of low electric motive force, also having in mechanical connection a device for setting a signal in the cab of a passing locomotive, said device being stationed in advance of the post and actuated simultaneously with, and by the changing of the signal at the post, a signal in the cab of a locomotive having means of connection with a signal setting device, whereby said cab signal is set to indicate danger if the next block is closed, (occupied,) said posts also automatically telegraphing the section office of the passage of trains,—number of cars in the train and the condition of the several blocks in the section. I further attain these objects by the mechanism illustrated in the accompanying drawings, in which—

Figure 1,— is a longitudinal view of a part of a railroad track (running, say, east and west), which is provided with my improved block system and signals, only one track of the road being shown. Fig. 1ª, Sheet 1,— is a cross section of the same taken at dotted line V. V. of Fig. 2ª, Sheet 3. It shows the mechanism which connects the railroad to the signal posts, and by which the said posts are operated by passing engines. Fig. 2, Sheet 2,— is a front elevation of the interior of a section office, (section C.) and also a side elevation of the interior of a signal post (E³, section C.). Fig. 2ª, Sheet 3,— is also a side elevation of the interior of a signal post (E², section C.) and its mechanical connection with its cab signal setting device. Fig. 3, Sheet 3,— is a rear view of an electrical enumerating instrument, showing its mechanism. Fig. 4, Sheet 4,— is a side view of a device for setting a signal in the cab of a passing locomotive, the post of which is in part a section taken at X X. of Fig. 5. Fig. 5, Sheet 4,— is a front view of same. Fig. 5ª, Sheet 4,— is a side view of a hand lever which may be used to operate the cab signal setting device, or arm. Fig. 6, Sheet 4,— is a side view of another form or modification of a cab signal setting device. Fig. 7, Sheet 5,— is a front view of the interior of the cab of a locomotive, showing the cab signal, also its connection with a tell-tale clock. Fig. 7ª is a detail view of the latch for the cab signal. Fig. 8, Sheet 5,— is a vertical section of the same taken at line Z. Z. of Fig. 7. Fig. 9, Sheet 5,— is a rear view of another form or modification of the cab signal. Figs. 10, 11, and 12,— illustrate another arrangement of the cab signal and setting device, Fig. 10 being the side elevation of a part of an engine and its cab, showing the standard, lever and end of the signal case. Fig. 11,— is a plan, of the same. Fig. 12,— is a vertical cross section of a cab, showing the position of the signal in the cab, also the signal setting device in connection.

Similar letters and numerals refer to similar parts throughout the several views, and further, the numerals connected to the letters, which indicate the batteries and instruments in the office, and also the line wires, correspond to, and show the signal post to which they connect.

Referring to Fig. 1, Sheet 1,— A. is a railroad track. B. C. D. are sections of the road,— C. being a full section of three blocks, only the last post in section B. and the first in section D. being shown. O is the office of section B., and O', the office of section C.

E. E. E. E. E. are signal posts electrically connected to the respective offices of their sections, and are numbered consecutively, beginning in each section with the post farthermost from the office.

E′, E′, E′, E′, E′, are the cab signal set-posts or arms, mechanically connected to the signal posts to which they belong. Thus E², section C. is a signal post electrically connected to the office, O′, and having the adjoining cab signal setting arm E′, connected to it. These posts are placed alongside of the track—one or more miles apart, the signal fronting in the direction from which the trains approach. The space between signal posts constitutes a block.

The cab signal setting devices are placed at such distance in advance of their respective posts as will permit a train of cars to be stopped before arriving at the post.

$a.\,a.\,a.$, are line wires connected with instruments in the office, and extend thence to the several posts. $b.\,b.\,b.$, are also line wires which extend from an automatic electrical switch or circuit changer, (hereinafter described,) of the first post in one section, to the last post in the preceding section.

20 and 76 are engines.

A′, A′, (Fig. 1ª, Sheet 1,) are rails.

$c.$ is a pin which passes down along the inside of the outer rail and bears on the end of the lever F. which has its fulcrum, $c'$, located at such a distance from its free end, that when the power end is only slightly depressed by the pin $c.$ being forced down, its opposite or free end will lift the upright rack-bar F′, sufficiently to give a half revolution to the signal shaft $k.$ by means of its rack acting on the pinion $k^3$, on said shaft $k.$ (Fig. 2, Sheet 2.)

C′, represents carbon batteries used on open circuits; G., gravity batteries used on closed circuits; H. H., relay magnets in the office so adjusted that the armatures are held closed and away from the platinum point $h.$ by a constant current passing through them.

H′, H′, are enumerating instruments (see Fig. 3), consisting of a dial I. having numbers around its margin, the space between the figures being divided into equal parts; $l^2, l'$, an electro-magnet; $l^2$, its armature which is a lever of the third order and has a pawl I³, pivoted on its free end; which will engage one tooth of the ratchet wheel $l^4$, at each movement of the armature when it opens, and moves said wheel forward one tooth or point when the armature closes. Said wheel is fast on the shaft $i.$ to which is also attached the index hand I⁵. Said shaft is mounted in suitable bearings. $i^2$, is an indent pawl acting on said wheel I⁴. These pawls are provided with the usual springs to bind them to service.

J′, J², J³, are galvanometers, similar in construction to that described in Letters Patent, No. 120,744, dated November 7, 1871, entitled improvement in circuit closers to which reference is had.

J⁵, are announcement drops, and are respectively numbered to correspond to the galvanometer or circuit closer, to which they connect as described in said Letters Patent.

Referring now to post E³, Fig. 2, Sheet 2, and also post E², Fig. 2ª., Sheet 3, $k.$ is a shaft mounted on bearings at the upper part of the post, and extending centrally through it from front to back. At its front end it has a signal disk, K′, permanently attached, said disk being, say, three feet in diameter, and consisting of a hub from which arms extend to a rim, thus forming a circular frame, which is covered with transparent material. One half of its face, R. is colored red,—and the other half W., white. Just back of this signal disk, and fast on said shaft is a stop-wheel, K², having a notch, $l^2$, in its rim, the use of which is hereinafter explained. Back of this stop-wheel is a pinion, $k^3$, fast on shaft $k.$ into which meshes the teeth of the upright rack-bar, F′. Said bar is provided with guides, F², and is of such length that it will reach from its bearings on lever F. to a point above its upper guide.

H², is a relay-magnet, adjusted that it will not not be effected or close its armature except by a current of higher electromotive force than that of the constant (gravity) current which passes through it. $h^2$, is its platinum point which is connected to the local carbon battery, C′.

L. is an instrument consisting of an electro-magnet provided with two armatures, L′, and L², which are levers of the third order. The adjustment of the armature L′, is of less resistance than that of L², yet it is such that it will not be closed by the constant (gravity) current which is passing through it. The free end of this armature L′, is reduced in size and when not in service is held back by a retraction spring, against an adjustable stop. When, however, it is in service and closed, its upper end comes in contact with a platinum point, $l$, which has a wire running to the ground, and thus short circuits the instrument as hereinafter explained. The armature, L², is at the opposite end of the magnet from L′. Its upper end $l'$, is bent outwardly at an angle to its shaft and is of such size that it will enter the notch $l^2$, in the rim of stop-wheel K², said notch being located so that when it is engaged by the armature L², it will hold the shaft, $k.$ from a return movement when the signal, R. is uppermost and exposed.

M. is a break-spring, $m.$ being its free end; $m'$, a pin on the rack-bar, F′, projecting under and just clear of said spring when the bar, F′, is elevated.

M′, is a short circuit spring. Its free end is pressed down on, and electrically connects with the break-spring M. by the projecting pin, $m^2$, on bar F′, when said bar is down.

M², is a resistance coil placed last in the constant, or closed circuit.

N. is an automatic switch or circuit changer. Its bar is a lever of the first order. Its fulcrum (pivot) $n^2$, is placed nearest the power end. Its opposite end is held in contact with the plate $n$, by a suitable spring, this being its normal position. $n'$, is a similar plate insulated from $n$. and a little apart from it. This plate, $n'$, is connected with the local carbon battery.

$m^3$, is a projection on the bar F', which comes into contact with the power end of the switch-bar when said bar, F', is moved upward, and causes said switch-bar to leave its connection with plate $n$. and connect with plate $n'$, but before the bar, F', has reached its full height the projection, $m^3$, lets go of the switch-bar which then returns to its normal position.

Having thus described the various instruments, magnets, &c., used in offices and posts, I now describe the run of the various circuits, premising that in all the circuits G', is the ground wire; the arrow heads on the lines marked, $a$. the course of the closed circuits; the arrow heads on the lines $b$., the open circuits; also that the galvanometers and instruments in the office, the posts to which they are connected, and the line-wires all have the same relative number—as before stated. Beginning at battery G³, in the office (Fig. 2), the circuit passes through the relay-magnet H³, holding it closed, then to and through the galvanometer, J³, thence by line wire $a^3$, to post E³, where it first connects with relay-magnet, H², passes through it to the double armature magnet, L. and through it to the break-spring, M.; thence to the coil M², and then by the wire, G', to the ground. The above is its course if the block represented by this post is closed or occupied by a train, and the red signal, R. exposed. (See Fig. 2ª.) At the same time in the office the index hand of the galvanometer will point to the zero (J', and J²). When the block is open (unoccupied) the circuit is as follows: The bar, F', being down (and the white signal, W. exposed), the short circuit spring, M', is pressed down by the projection, $m^2$, on the break-spring, M. (Fig. 2,) and makes electrical connection with it. The course of the current is thereby changed, taking the short route to the ground through the spring, M'; thus cutting out the coil, M², resulting in the deflection of the index hand of the galvanometer to the right of zero, as is shown by J³, (Fig. 2,) and thereby shows in the office that the block is open. The line wire to the last post in a section extends directly to it from the office as seen in post, E³, section C. but with all other posts in the section, it first enters the post which is in advance of it (to the course a train is moving), and connects to the plate $n$. of the switch, N. It then passes through and out of the switch at the pivot, $n^2$, to its proper post, as will be seen by reference to Fig. 2, which shows the line $a$. from galvanometer, J³, to the switch, N. of post E³, thence to the relay magnet, H², of post E². Thence its circuit is the same as above described.

The open or carbon circuits which connect one post with the other,—are as follows: When an engine passes a post, (post E³, section C., for instance,) and raises the bar F', the projection $m^3$, moves the switch bar N. from its normal connection with plate $n$. into connection with plate $n'$, cutting out the gravity current and office instruments, and closing the open circuit which will then extend from the local carbon battery of this post (see Fig. 2), to and through the switch bar N. and the line wire $a^2$, to the relay magnet H², of post E², section C. (see Fig. 2ª.) and cause its armature to connect with the point $h^2$, closing the circuit from the local battery of this post (E²), which extends from said battery through the relay-armature and wire connected to its pivot, to the double armature magnet L. causing its armature L', to connect with the point $l$, whereupon the current will be through the bridle $b$. to the pivot of the armature L. through it by the ground wire G', to the ground; thus cutting out the resistance coil, whereupon the armature L², will close; the action of said armature L', and L², being synchronous.

The switch N. of the first posts in a section (see E', section D., and E', section C. Fig. 1), is connected to the last post of the preceding section by a special wire. In this case the circuit is as follows: Referring to Fig. 2, beginning at battery C', post E', section D. the circuit extends to the plate $n'$, through the switch arm N when in contact with plate $n'$, as above described, to and through the wire $b^3$, to the post E³, section C. where it connects with the line wire $a^3$, through which its circuit is continued to the relay-magnet H², of this post from whence its course is the same as above set forth.

The cab signal setting device consists of a post, P. about twelve inches square, which is securely fixed in an upright position on the same side of the track as, and in line with the signal post to which it is an adjunct, and at such preceding distance as will permit a train to be stopped before arriving at said signal post. Its height is relative to the actuating mechanism of the cab signal and is such that the arm, P', when extended over the railroad track will make mechanical connection with lever S⁵, (hereinafter described.) From the back of this post P. projects upward and rearward at an angle of about twenty-two degrees, a limb, P², its height being about the same as that of the post. Both post and limb are mortised through from front to rear at their upper ends, $p'$, said mortises being in line,—the one with the other and are provided with anti-friction rollers, P³, which are journaled in their sides; the rollers in the mortises being, one at the top and one at the bottom, the space between them being a little more than the width of the arm, P', so that it can freely move longitudinally between them. The roller in the limb, P², is placed at the lower end of its mortise. The arm is of such dimensions that it will move back and forth in these mortises, riding on the lower roller of the post and that in the limb. It is of a length that when projected from the front of the post it will extend over about one third of the width of the track, as is shown by dotted lines $p^4$; and its rear end bears on the roller of the limb. Its outer end is provided with a roller, $p$. placed lengthwise on its under side. A chain, $p^5$, having a weight $p^3$, heavy enough to move the arm to the rear, passes over a groove in the center of the limb roller, from the rear of the limb to the front, and in line with and under the arm, down over a groove in the lower roller of the post. It is attached to the arm at such distance back from its front end; as will draw the arm forward and cause it to project over the track the required distance, when the chain is drawn forward, or withdraw it by the weight, $p^3$, when the chain is relaxed. Said chain extends down from the front roller in a groove in the face of the post, passes around a pulley, $p^6$, at the bottom of the post, the axle of the pulley being at right angles to the face of the post, and thence to the lower end of bar, F', in the signal post. Here it passes around a pulley and extends up into the signal post, and is attached to bar, F', just above its bearing on the lever, F. A modification of this cab signal setting device, is shown in Fig. 6, Sheet 4. It consists of the post, P. mortised through from front to back at the top, in which is journaled, the arm, R', at such distance back from its front end, that when the arm is in a horizontal position it will extend over the track as above mentioned. The chain $p^5$, is attached to the underside of the arm at the front of the post and brings it to the horizontal position when drawn on, and when relaxed a weight or counter-balance mounted on the rear end of the arm, R', raises the front end and its roller, R². The chain passes around the pulley $p^6$, at the foot of the post, thence to the signal post as described of the first device.

Fig. 12, Sheet 6, shows another modification of the signal setting device and arrangement of the cab signal. The signal setting device is similar in construction to the one last above described, except that the roller, R⁴, is vertical and mounted on the end of arm R', (see Fig. 11,) and the arm is shorter so that it will project when in a horizontal position such distance as would bring its roller, R⁴, to within, say, eight inches of the side of a passing engine cab, and a few inches below its roof. The cab signal setting device may be used separate and apart from the signal posts by connecting the chain $p^5$, with a lever such as that shown in Fig. 5ª.

The cab signal is illustrated in Figs. 7 and 8, Sheet 5. It consists of a rectangular case, S. about five and one-half inches wide by fifteen inches in height and two and one-half inches deep. It has an opening, S', in its front at a little more than one-third of its height from the bottom, and is about four inches square. At this opening the signal is exposed to the view of the engineer. A rod, S², extends such a height above the roof of the cab as may be required to clear the roofs of the cars in a train,—then down through the roof of the cab of the engine, and through the center of the case. The upper end of this rod has a bifurcated head S³. Its lower part passes through and takes bearing on the top of the spiral spring, s. which bears on and is secured to the bottom of the case. Said spring is of such resistance that it will a little more than counter balance the weight of the rod, S², the signals and a part of the lever, S³. A card of paper board or other material, nine or ten inches long and a little less in width than the internal width of the case is permanently mounted on the rod inside of the case, its upper end being against the top of the case when the spiral-spring is expanded and the rod at its highest point. This card is divided transversely into two equal parts. The upper one, R', is colored red, and the lower one, W', white. Under the bottom or the case is attached a spring latch, s³. This latch engages the notch s', in the rod when it is pressed down, and holds the red signal, R', in view until relaxed. The spring then raises the rod so that the signal W', is exposed to view. The free end of the latch which extends beyond the side of the case acts upon a light lever; s⁴, (of the first order,) which acts in turn on the punching lever of a tell-tale or watchman's clock, W², that whenever the latch is moved to release the rod, S², and change the signal from red to white, a record will be made on the dial paper in the clock; of the hour and minute of such change. A standard, S⁴, is firmly secured to the engine at the side. It is of such height that it will be just below the roller, $p$. of the projecting arm of the cab signal setting device. Its upper end is forked and receives one end of the lever, S⁵, which is pivoted therein. Said lever is of the third order and extends to, and rests in the bifurcated head S³, of the signal rod, S². At this end it is slotted longitudinally through its side and a bolt through the head, S³, passes freely through the slot and secures the lever, S⁵, from being thrown out of its connection with the rod. By reference to Fig. 8, Sheet 5, it will be seen that the head of S², is much higher than the top of the standard so that the lever, S⁵, in its course from one to the other forms an inclined plane, also that the roller $p$. of the arm, P', of the signal setting device is of such relative height that as the engine passes under the arm, the lever and also the signal rod will be forced down and the white signal changed to red.

Another form of the cab signal is shown in Fig. 9, Sheet 5. T., is the case having its back removed. S², is a vertical rod passing a little to one side of its transverse centers. It is provided with a rack T², which acts on the pinion, T³, fast on a shaft which has mounted on its front end a signal disk, T⁴, which is equally divided into red and white signals. An opening in the front of the box, less than half the size of the disk admits the signal to view. S. is a spiral spring placed on top of the case, and acts on the rod S², to raise it. Said rod is provided with bifurcated head connections as the rod in the signal last above described.

When the form of the signal setting device, last above described, (Figs. 11 and 12,) is employed the cab signal is horizontal in the cab in place of vertical, and its rod S², projects through the side of the cab, (in place of the roof,) and is connected with the lever S⁵, as before described. Said lever is curved inwardly (S⁶), and is connected to the top of the standard S⁴, by a vertical pivot so that the lever has a lateral movement. The standard, S⁴, is mounted on, say, the outer edge of the foot-board, S⁷, of the engine, and is provided with the pivot as above mentioned. (See Fig. 10.)

Operation: When a train passes a post (signal post, E³, for instance), the first wheel of the engine (20) will by means of the pin, c. in the outside rail, A', and the lever F., raise the bar, F', and give one half revolution to the shaft, k. and change the signal from white to red, at which it will be held by the armature of the instrument, L., impinging in the notch, l², of the stop wheel, K². As the bar, F', is raised, the chain, p⁵, is drawn upon and the arm P', of the cab signal setting device is extended over the railroad track, and remains in that position as long as the bar, F. is up and the red signal exposed,—and further the projection, m³, on the bar, F', comes in contact with the power end of the switch lever, N. and as it passes, changes its connection from plate, n. to plate n'. This cuts out the gravity current, a., and brings the local carbon battery, C', of this post into circuit with the relay-magnet, H², of post E², section C. which in turn brings its local carbon battery as before described into circuit with the double armature magnet, L. The first effect of this current is to close the armature, L', bringing it into contact with the point, l. and short circuit the instrument so as to cut out the resistance of the coil, M². When this is done, the armature, L², will instantly close, thereby releasing the stop wheel, K², and shaft K, will by reason of the weight of the bar, F', make a half return revolution and change the red signal to white. The bar (post E², section C.) being down, releases the chain, p⁵, and the weight, p³, draws the arm, P', of the cab signal setting device of this post from its projection over the track, and further, the projection m², of the bar, F', brings the short circuit spring, M', into contact with the break-spring, and by cutting out the resistance coil, M², acts on the galvanometer as before described; and shows the operator the change of the block from closed to open. Although the bar, F. at signal post, E³, is held up, it will receive a slight motion from each wheel of the passing train. This motion is conveyed by the pin, m', to the break-spring, M. causing it to alternately break and make connection with the plate at its free end, (m.) and this breaking and making of the current acts on the galvanometer, causing its index hand to swing to the left of zero and return, and also causes the relay-magnet, H³. to release its armature, which then comes into contact with the point, h., closing the circuit of the office carbon battery with the instrument, H', to be broken again when the gravity circuit is made. This alternate action on the magnet and armature of instrument, H', causes its index hand to advance on the dial, one point at each movement, and thus enumerate the number of wheels in a train passing the post, and thus gives the number of cars. When the train has passed, the standing of the index hand of the enumerating instrument is recorded, and the hand turned up to zero, (0) ready for the next train. When a block is occupied as shown in Fig. 2ª., the arm of the cab signal setting device of the signal post last past, by the occupying train, will be extended horizontally over the track. A following engine when it passes under this arm will bring the lever, S⁵, of its cab signal into contact with the roller of the arm which will force the lever and rod, S², down, changing the white signal to red, thus warning the engineer to stop until the signal at the signal post, at which he halted, shall change from red to white, showing the block ahead of him to be clear. On passing into the open block the engine sets the danger signal at the signal post thus closing the block it enters, and also opens the block it has just left, by changing its red signal to white, as before described. Should a train be run past a post when the red signal is set, the action of the wheels of the train,—as before described—on the break-spring will telegraph it to the operator at the office, by the action of both the galvanometer and enumerating instrument and as the hand of the galvanometer constantly returns to zero, indicates that the danger signal was exposed when the block protected by said post was entered. When a post has been passed, the red signal in the cab is released by withdrawing its latch, and the time will be recorded in the clock.

It will be seen by those skilled in the art, that a relay-magnet, having the arm of its armature extended, so as to act as an index on a dial in connection with a break-spring might be used as a substitute for the galvanometer, to indicate the state of a block—whether open or closed. In this case the resistance coil would not be required, also that other forms of electrical instruments might be used. The use of any such instruments I claim as mechanical equivalents. Again, in place of the enumerating instrument described, one or more pen registers might be used. This, I also claim as a mechanical equivalent. It will be understood that regular telegraphic connection is had between the section offices and also the division office.

I claim—

1. In signals for railways, a signal system consisting of a railroad divided into sections, and the sections into blocks, each section having an office provided with a suitable indicating instrument or instruments, an automatic signal post to each block, a cab signal setting device in advance of and connected to the signal post; a signal located in the cab of a locomotive engine or on a train, and having means of connection with said device; each section office being electrically connected with each post in its section, and each post being electrically connected to the post next preceding it, substantially as specified.

2. In signals for railways and the like; a signal system consisting of the following: one or more sections, each of which has an office or station; an indicating instrument or instruments in each office or station; the section or sections divided into any desired number of blocks, a signal-post at the entrance of each block, means operated by a passing engine or train for changing a set signal at a post and a special closed circuit and a line-wire extending from each individual post to its corresponding indicating instrument or instruments in its respective office or station, to control said instrument or instruments and show the condition of the block represented by said post, substantially as set forth.

3. In signals for railways and the like, a signal system consisting of the following:—one or more sections, each of which has an office or station, indicating instrument or instruments in each office or station; the section or sections divided into any desired number of blocks, a signal post at the entrance of each block, a closed circuit to control said indicating instrument or instruments, and an open circuit of greater electro-motive force than the closed circuit; means operated by the engine for changing the signal, as it passes the post, a switch operated by the signal changer to close said open circuit, for the purpose of changing the signal to safety at the post at the entrance of the block the train is leaving, substantially as specified.

4. The combination in a signal system of one or more sections, each of which is provided with an office or station, one or more blocks in each section provided with a signal post at the entrance of each block, indicating instrument or instruments located in the office or station, a closed circuit connecting each post with an indicating instrument or instruments, a resistance coil, an open circuit of greater electro motive force than the closed circuit and connecting the post of one block with the post of the block next preceding it, a device in each post operated by a passing engine for changing the signal and releasing the short circuit spring in this post to bring the coil into action in the closed circuit, and indicate on said instrument that the block the engine is entering is occupied; and by operating a switch close said open circuit and thereby through suitable mechanism change the signal at the signal post at the entrance of the block the engine is leaving; and by the short circuit spring in this post cut out the coil and show on the indicating instrument that this block is clear or unoccupied.

5. The combination in a signal system of an indicating instrument or instruments, located in an office or station, a closed circuit, a signal post connected by said circuit with said indicating instrument, a short circuit spring a resistance coil and means in the signal post operated by a passing engine for changing the signal, to release or open the short circuit spring, and bring the coil into circuit and show on said indicating instrument the character of the signal displayed at the post.

6. The combination in a signal system of an indicating instrument or instruments, located in an office or station, a closed circuit, a signal post connected by said circuit, with said indicating instrument, a short circuit spring, a resistance coil, and means located in said post for closing said spring, cut out the coil and show on the said indicating instrument, the character of the signal displayed at said post.

7. The combination of an open circuit, a relay or circuit closer, an enumerating instrument, all located in an office or station, a signal post provided with a break spring, a closed circuit connecting said relay with said break spring, and means operated by a passing engine or train which operates on the break spring, for the purpose of indicating on said office instrument the passing of a train past said post, and the number of cars in such train, substantially as specified.

8. In a signal system, the combination of a signal post provided with danger and safety signals, means operated by a passing engine or train for setting a signal, a stop for holding the signal when set, an open local circuit and battery, a relay magnet, electro magnets for releasing the set signal, a foreign battery having an open primary circuit extending to and connected with said relay, and means located at a distance operated by a passing engine or train to close said primary circuit and actuate the relay to close said local circuit, substantially as specified.

9. In a signal system, the combination of a signal post provided with danger and safety signals; means operated by a passing engine or train for setting a signal, a stop for holding the signal when set, a foreign battery, a primary open circuit and a circuit closer, a secondary open (local) circuit and battery, a relay magnet and electro magnets for releasing a set signal, substantially as set forth.

10. In a railway system, an enumerating instrument, located at an office or station, a local battery and open circuit a relay magnet, a closed circuit, which passes through said relay to a signal post, means operated by a passing engine or train which alternately open and close said closed circuit, and actuates said relay to alternately close and open said local circuit and so actuate said enumerating instrument, substantially as specified.

11. In railway or other signals the combination with a signal changer, of an electro magnet having two synchronized armatures, one of which is of less resistance than the other and is provided with means of connection with a ground wire, thereby changing the circuit and reducing the electrical resistance to the other armature, which is thereby caused to release a set signal, substantially as specified.

12. The combination in a signal system of an indicating instrument or instruments located in an office, a signal post, an electrical circuit extending from said instrument or instruments to said post, a break spring, a resistance coil, and means located in said post and actuated by a passing engine or train and operating on said break spring, to indicate on said indicating instrument or instruments, the passing of an engine or train, and the character of the signal displayed at said post, substantially as specified.

13. In a signal system for railways, consisting of a railway divided into sections and the sections into blocks, each section having an office or station, and each block an automatic signal post, electrically connected with its respective office, and with the signal post next preceding it, and also having mechanism operated by a passing engine or train to set a danger signal at said post, in combination therewith, an adjunct to said post consisting of a post P provided with an arm, a roller mounted on the end of the arm nearest the track; said adjunct being located at the side of the track at a distance from and in advance of said signal post, and having means of connection with said post whereby its roller is thrown into a position simultaneously with and by the setting of a danger signal at said signal post, to actuate the lever $S^5$ located on a passing engine to set a danger signal in the cab of said engine, substantially as shown and described.

14. In railway signals, a device for setting a signal in a signaling apparatus on a passing engine or train, said device consisting of the post P, pivoted lever or arm R', having a roller mounted on that end of the arm nearest the track, and a counter balance on the other or rear end a chain $p^5$ and pulley $p^6$ said arm and roller when in an operative position having a relative height to the lever $S^5$ located on said engine or train, substantially as shown and described.

15. In railway signals, a device for setting a signal in a signaling apparatus on a passing engine or train consisting of the post P, having the limb $P^2$ said post having the rollers $P^3$ a sliding arm P', provided with a roller on that end nearest the track, a chain $p^5$ and pulley $p^6$ a second chain $p^2$ connected to said arm, and passing over the roller $P^3$ of the limb and a weight $p^8$ on its free end, said arm and roller when in an operative position having a height relative to lever $S^5$ located on said engine or train, all combined and operating substantially as described and for the object set forth.

WILLIAM M. CUTHBERT.

In presence of—
H. GRIGGS,
HERMAN LEHRENKRAUSS.